(12) United States Patent
Koenig et al.

(10) Patent No.: US 11,661,260 B1
(45) Date of Patent: *May 30, 2023

(54) EXPANDABLE PIZZA CONTAINER

(71) Applicants: Tate Koenig, Aurora, OR (US); Matt Poeschi, Aurora, OR (US); Jeff Koenig, Aurora, OR (US)

(72) Inventors: Tate Koenig, Aurora, OR (US); Matt Poeschi, Aurora, OR (US); Jeff Koenig, Aurora, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/160,279

(22) Filed: Jan. 26, 2023

Related U.S. Application Data

(63) Continuation-in-part of application No. 17/727,683, filed on Apr. 22, 2022.

(51) Int. Cl.
*B65D 81/34* (2006.01)
*B65D 85/36* (2006.01)
(Continued)

(52) U.S. Cl.
CPC .......... *B65D 81/3461* (2013.01); *A47J 47/08* (2013.01); *A47J 47/14* (2013.01); *B65D 21/086* (2013.01); *B65D 25/108* (2013.01); *B65D 43/0212* (2013.01); *B65D 51/1672* (2013.01); *B65D 85/36* (2013.01); *B65D 2543/0099* (2013.01); *B65D 2543/00111* (2013.01); *B65D 2543/00537* (2013.01); *B65D 2543/00648* (2013.01);
(Continued)

(58) Field of Classification Search
CPC .. A47J 47/08; A47J 47/14; B65D 6/00; B65D 6/18; B65D 21/086; B65D 25/108; B65D 43/02; B65D 43/0204; B65D 43/0212; B65D 43/0222; B65D 51/1672; B65D 81/26; B65D 81/261; B65D 85/36; B65D 85/54; B65D 2543/00648; B65D 2543/00685; B65D 2543/00759; B65D 2543/00805; B65D 2543/0099; B65D 2581/3437; B65D 2585/366; B65D 81/34; B65D 81/3461
USPC ................................ 206/551; 220/666, 667
See application file for complete search history.

(56) References Cited

U.S. PATENT DOCUMENTS 4,881,658 A * 11/1989 VanCucha .......... B65D 43/0212
220/795
5,269,430 A * 12/1993 Schlaupitz ........... B65D 43/162
220/4.23
(Continued)

FOREIGN PATENT DOCUMENTS

CN 114305042 A * 4/2022

*Primary Examiner* — Bryon P Gehman
(74) *Attorney, Agent, or Firm* — Mark S Hubert PC

(57) ABSTRACT

An expandable triangular pizza storage container with a set of microwaveable triangular trays for the separation, microwaving and serving of individual slices of pizza. The storage container has a series of concentric triangular compartments that are expanded from a flexible polymer, accordion-style container body. The lid also has a triangular configuration with a replaceable compressible gasket, a set of four locking wings extending from each side that frictionally engage a rigid triangular top ring of the container body, and a central vent. The trays may incorporate uniform concave pockets to facilitate crisping of the pizza crust in the microwave and be of a solid or cored design, of microwave and dishwasher friendly material.

12 Claims, 9 Drawing Sheets

(51) Int. Cl.
 *B65D 51/16* (2006.01)
 *B65D 43/02* (2006.01)
 *B65D 25/10* (2006.01)
 *A47J 47/08* (2006.01)
 *A47J 47/14* (2006.01)
 *B65D 21/08* (2006.01)

(52) U.S. Cl.
 CPC .............. *B65D 2543/00685* (2013.01); *B65D 2543/00759* (2013.01); *B65D 2543/00805* (2013.01); *B65D 2581/3437* (2013.01); *B65D 2585/366* (2013.01)

(56) References Cited

U.S. PATENT DOCUMENTS

| | | | |
|---|---|---|---|
| D393,883 S * | 4/1998 | Haygood | D21/372 |
| 5,862,932 A * | 1/1999 | Walsh | B65F 1/1615 |
| | | | 220/666 |
| 6,315,151 B1 * | 11/2001 | Hupp | B65D 21/086 |
| | | | 220/666 |
| 8,317,047 B2 * | 11/2012 | Vanderberg | F25D 3/06 |
| | | | 220/666 |
| 8,365,910 B2 * | 2/2013 | Valaie | B65B 55/02 |
| | | | 206/363 |
| 9,260,221 B1 * | 2/2016 | Hertz | B65D 21/0222 |
| 9,486,096 B1 * | 11/2016 | Hertz | B65D 85/72 |
| 9,718,573 B1 * | 8/2017 | Hertz | B65D 11/20 |
| 11,325,753 B2 * | 5/2022 | Johnson | B65D 81/3813 |
| 2003/0015534 A1 * | 1/2003 | Lown | B65D 45/16 |
| | | | 220/324 |
| 2014/0262920 A1 * | 9/2014 | Andrews | B65D 25/04 |
| | | | 29/592 |
| 2021/0237933 A1 * | 8/2021 | Swarts | B65D 21/08 |

\* cited by examiner

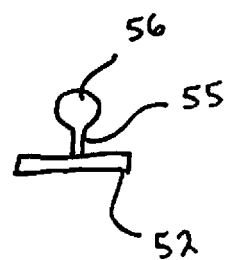
FIG. 12
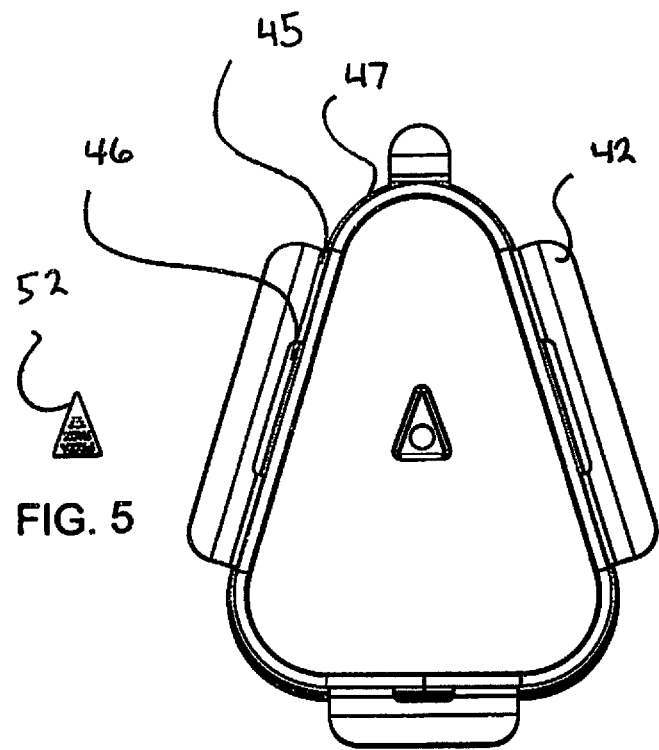
FIG. 5
FIG. 3

EXPANDABLE PIZZA CONTAINER

PRIORITY CLAIM TO A NONPROVISIONAL APPLICATION

This application is a continuation in part of U.S. patent application Ser. No. 17/727,683, filed Apr. 22, 2022, entitled "Expandable Pizza Container" which is incorporated by reference herein in its entirety.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to food storage technology, and more particularly to an expandable, multi-slice pizza storage container.

BACKGROUND

Pizza is one of the staples of the American diet. The drawback is that pizza from restaurants and to-go pizza parlors, generally don't come in single serving portions. Rather, they come sliced in whole pies, enough to feed four or more people. This causes a dilemma when a pizza pie is ordered for less than four people. This causes the leftovers to be individually wrapped or put into multiple storage containers. This takes unnecessary space in the refrigerator since pizza slices are generally triangular and conventional refrigerator storage containers are square or round. Regardless, they must be microwaved individually on another plate, and both the plate and container must be washed.

Henceforth, a dedicated pizza storage container that was adapted for the storage and reheating/crisping of multiple slices of pizza pie would fulfill a long felt need in food storage industry. This new invention utilizes and combines known and new technologies in a unique and novel configuration to overcome the aforementioned problems and accomplish this.

BRIEF SUMMARY

In accordance with various embodiments, an expandable, triangular, multi-slice pizza storage container is provided.

In one aspect, a pizza container with triangular trays for use in the separation of pizza slices to be stored, as well as for use as an individual pizza slice microwaveable crisper and serving tray is provided.

In another aspect, a triangular expandable, multi-level pizza storage container with a vented, lockable lid is provided.

Various modifications and additions can be made to the embodiments discussed without departing from the scope of the invention. For example, while the embodiments described above refer to particular features, the scope of this invention also includes embodiments having different combination of features and embodiments that do not include all of the above described features.

BRIEF DESCRIPTION OF THE DRAWINGS

A further understanding of the nature and advantages of particular embodiments may be realized by reference to the remaining portions of the specification and the drawings, in which like reference numerals are used to refer to similar components.

FIG. 3 is a top view of the lid with the vent cap removed;

FIG. 5 is a top view of the vent cap;

FIG. 12 is a cross sectional view of the bulbous extension;

DETAILED DESCRIPTION OF CERTAIN EMBODIMENTS

Figure 1:
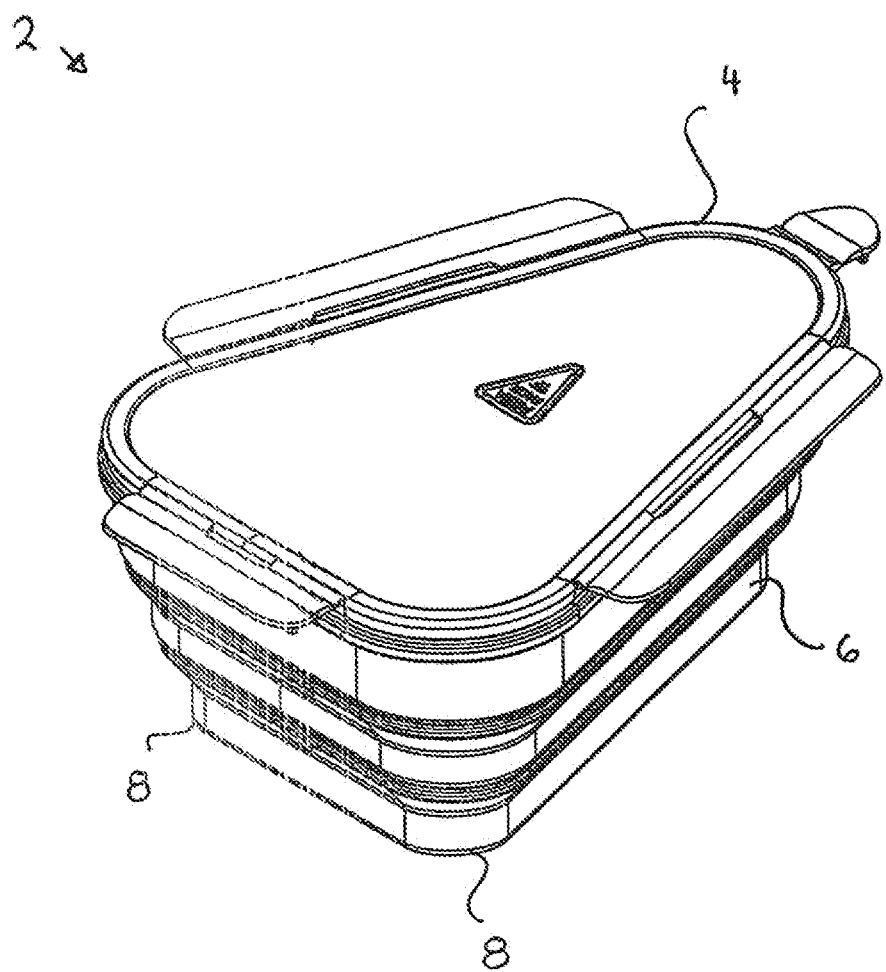
FIG. 1 is a perspective top view of the expanded pizza storage container with the lid in an unlocked configuration.

While various aspects and features of certain embodiments have been summarized above, the following detailed description illustrates a few exemplary embodiments in further detail to enable one skilled in the art to practice such embodiments. Reference will now be made in detail to embodiments of the inventive concept, examples of which are illustrated in the accompanying drawings. The accompanying drawings are not necessarily drawn to scale. The described examples are provided for illustrative purposes and are not intended to limit the scope of the invention. It should be understood, however, that persons having ordinary skill in the art may practice the inventive concept without these specific details.

It will be understood that, although the terms first, second, etc. may be used herein to describe various elements, these elements should not be limited by these terms. These terms are only used to distinguish one element from another. For example, a first attachment could be termed a second attachment, and, similarly, a second attachment could be termed a first attachment, without departing from the scope of the inventive concept.

It will be understood that when an element or layer is referred to as being "on," "coupled to," or "connected to" another element or layer, it can be directly on, directly coupled to or directly connected to the other element or layer, or intervening elements or layers may be present. In contrast, when an element is referred to as being "directly on," "directly coupled to," or "directly connected to" another element or layer, there are no intervening elements or layers present. Like numbers refer to like elements throughout. As used herein, the term "and/or" includes any and all combinations of one or more of the associated listed items.

As used in the description of the inventive concept and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise indicated, all numbers herein used to express quantities, dimensions, and so forth, should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

As used herein, the term "bulbous" refers to s shape that resembles a light bulb with a generally spherical end top end that is necked down in diameter at its other end.

As used herein, the term "generally triangular shape" refers to a geometric configuration of a triangle with rounded corners.

As used herein, the term "dimpled" means a surface with a series of small indentations formed thereon.

The present invention relates to a novel design for a vertically expandable triangular, pizza storage container with a vented lockable lid and separation/serving trays that are microwaveable.

Figure 2:
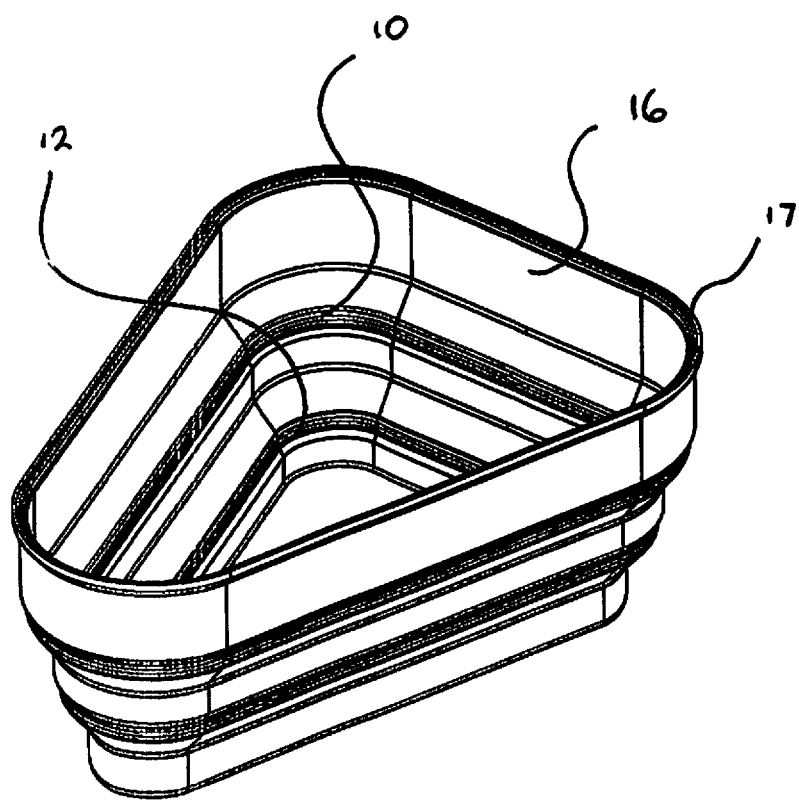
FIG. 2 is a perspective top view of the expanded pizza storage container with the lid removed.
Figure 9:
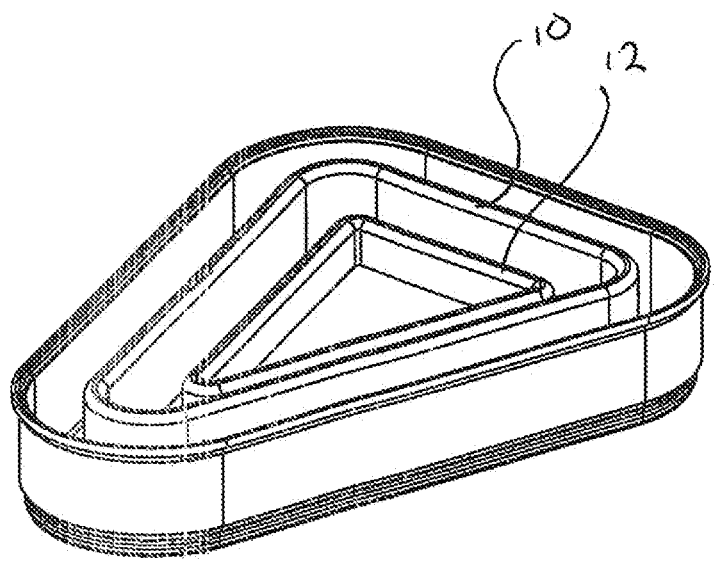
FIG. 9 is a perspective top view of the collapsed pizza storage container.
Figure 10:
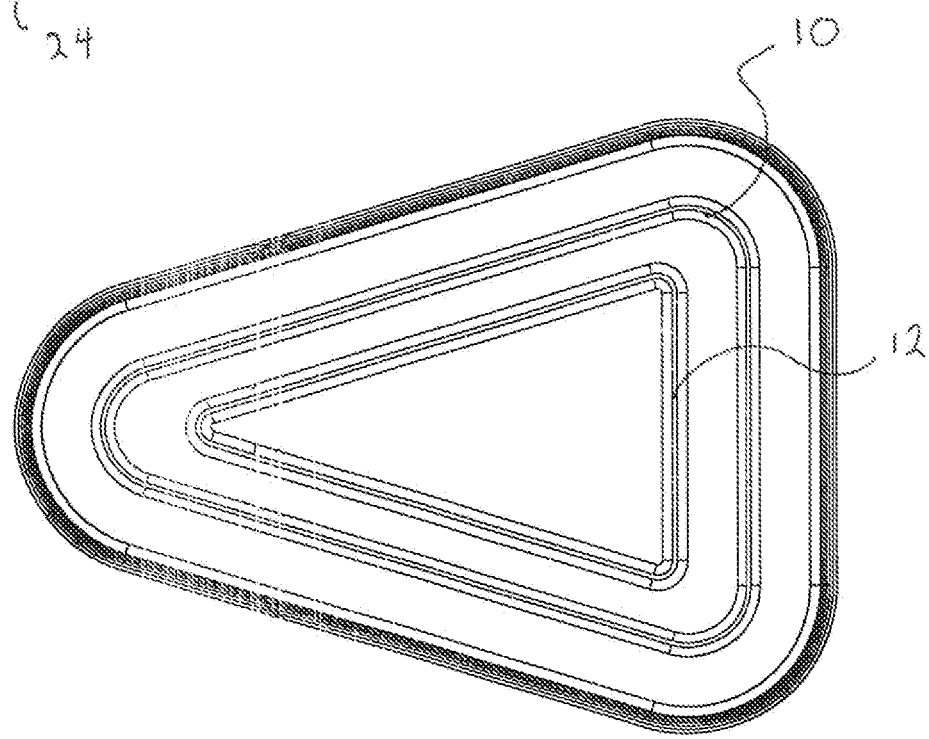
FIG. 10 is a top view of a collapsed pizza storage container.

Looking at FIGS. 1 and 2 the expandable pizza container 2 ("container") can be seen in its expanded configuration with and without the lid 4 on the container body 6. The body 6 has a generally triangular shape with rounded corners 8. It is made of a flexible polymer and its three sides 16 are pleat folded in the style of an accordion so as to form an upper pleat 10 and a lower pleat 12. Although in alternate embodiments, there may be more or less pleats. When the container body 6 is collapsed (FIGS. 9 and 10) these two pleats are concentrically nested in the same plane. These two pleats allow the container body 6 to have five concentric vertical levels of pizza storage when the container body 6 is expanded. The container body 6 has a planar, unadorned bottom face.

Figures 6, 8:
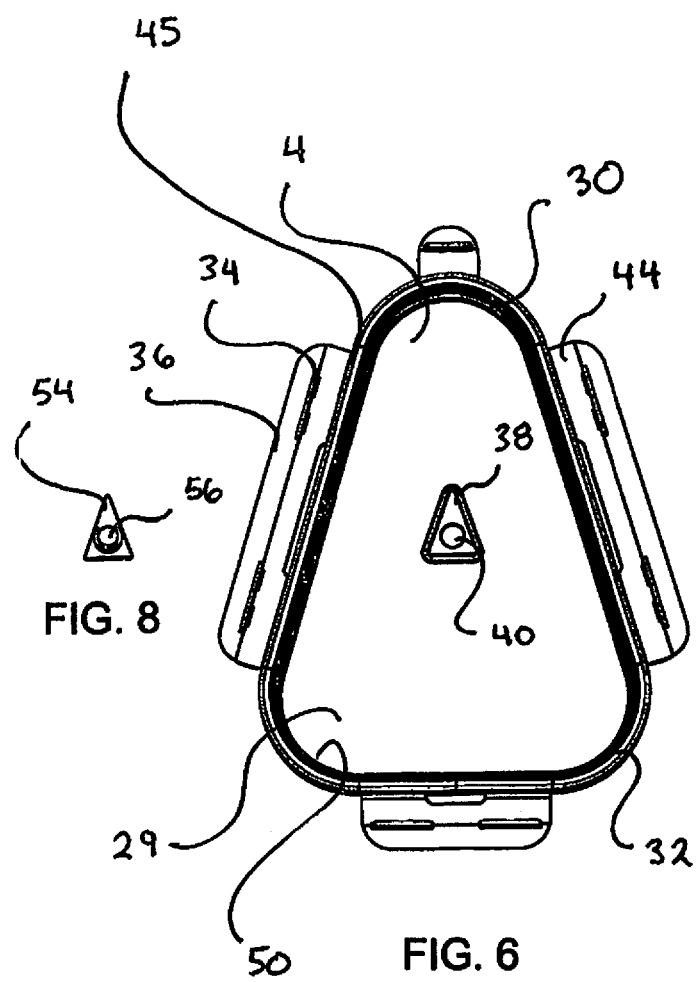
FIG. 6 is a bottom view of the lid.
FIG. 8 is a bottom view of the vent cap.
Figure 11:
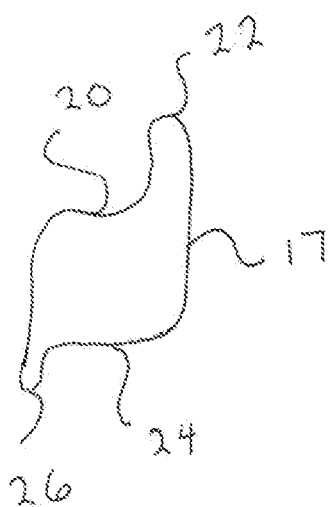
FIG. 11 is a cross sectional view of the container body's seal ring.

The top peripheral edge of the container body 6 has a rigid polymer seal ring 17 bonded to the top of the flexible sides 16. In the seal ring's cross section view (FIG. 11) it can be seen that it is a solid generally triangular ring, with a planar top face 20 having an inner raised lip 22, and planar bottom face 24 having an outer raised lip 26. The top face 20 serves as a surface for the compression of the removeable, compressible gasket 30 housed in the gasket groove 32 of the lid 4. (FIG. 6). The outer raised lip 26 acts to frictionally secure the lock tabs 34 of the locking wings 36 extending from the lid 4 and ensures the lid 4 stays on and the gasket 30 stays compressed guaranteeing freshness of the container's contents.

Looking at FIGS. 3 and 6, the lid 4 can best be described. The lid 4 also has a generally triangular shape and a planar top face 29 with an orifice 40 formed in a triangular depression 38 thereon. The lid 4 is made of a rigid, transparent polymer and has a series of four hinged locking wings 36 extending from the sides of the lid 4. Each locking wing 36 has a top face 42 and a bottom face 44 with at least one T shaped lock tab 34 projecting perpendicularly from its bottom face 44. The hinges 45 are merely extensions of the locking wings 36 onto the lid's outer periphery 47. These hinges 45 do not extend the full length of the locking wings 36 as there are through slots 46 used to minimize the amount of material in the hinge 45 for flexibility purposes.

The lid 4 has a compressible polymer gasket 30 that is frictionally housed in the generally triangular gasket groove 32 that runs around the outer edge of the lid 4. The gasket groove 32 is formed adjacent an inner lid flange 50 that extends perpendicularly downward from the bottom face of the lid 4, tracing the same generally triangular configuration as the lid 4 and the container body 6. When the lid 4 is fitted onto the container body 6, the inner lid flange 50 abuts the seal ring 17 and aligns the lid 4 and the container body 6 so that the compressible gasket 30 is properly seated onto the planar top face of the seal ring 17 prior to compression.

The vent cap 52 (FIG. 5) is a flexible triangular flap sized to fit within the triangular depression 38 on the lid 4. Its bottom face 54 has a bulbous extension 56 extending therefrom that is compressible and pliable, and sized slightly larger than the orifice 40. (FIG. 8) With the application of side to side and downward pressure on the top face of the vent cap 52 the bulbous extension 56 will pass through the orifice 40 and retain the triangular vent cap 52 in the triangular depression 38. Since the extension 56 has a bulbous configuration, the neck 55 has a diameter less than the diameter of the orifice 40. (See FIG. 12) This narrower neck of the extension, being smaller than the orifice 40, allows the vent cap to rise in the depression 38 as needed to allow pressurized air from the sealed container to escape. Gravity and the frictional forces of the taper of the neck 55 the extension 56 causes the vent cap 52 to close when the pressurized air has been vented.

Figure 4:
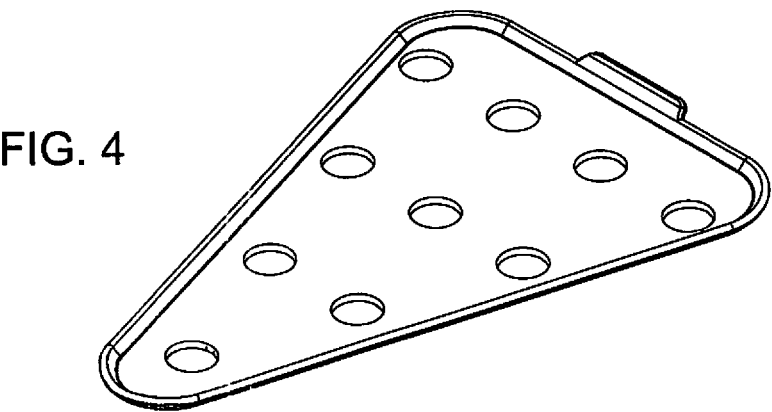
FIG. 4 is a top perspective view of the dimpled tray.
Figure 7:
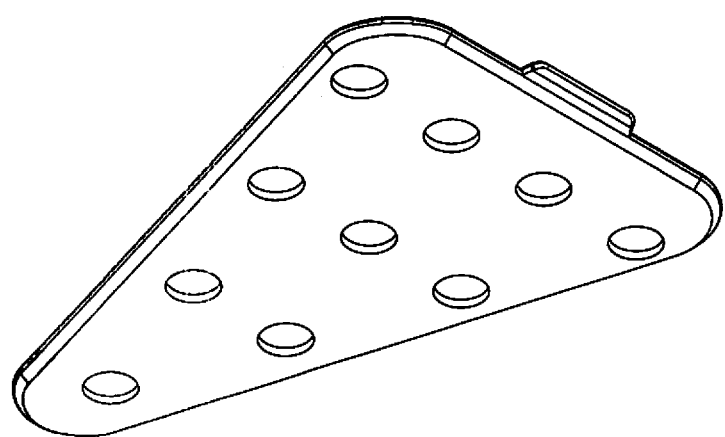
FIG. 7 is a bottom perspective view of the dimpled tray.

Looking at FIGS. 4 and 7 the dishwasher and microwave safe dimpled trays 60 can best be seen. As can be seen in the figures, the chosen form of concave indentation that forms the dimple from the top face, is that of a circular cylinder, although other configurations are envisioned in other embodiments with the common element of being concave.

These trays 60 also share the same generally triangular configuration as the container body 6 and lid 4, although dimensionally is slightly smaller than the container body's bottom face 14 so a tray 60 may be used on even the smallest of pizza slices stacked on the bottom of the container 6. The trays of the preferred embodiment 60 have a dimpled planar top face 62 and a peripheral lip 64 extending around the tray 60. This holds the slice of pizza on the tray 60 as well as any oils that drip from the pizza during the microwave process. On one side (end) of the tray 60, there is a raised finger tab 66 for lifting the tray 60 and its slice of pizza.

When the pizza slice is heated in the microwave, the tray 60 absorbs the microwaves and cooks food from the hot tray bottom, to make the tray 60 like a fry pan and grill plate. To an extent, it also shields microwaves from entering the food lessening the damage to the nutrients of the food from microwave penetration. Additionally, the dimples 70 allow for heat to transfer directly to the pizza bread. These dimples 70 allow moisture to escape, so the pizza crust becomes crispy and brown, which along with the hot tray, crisps the crust. The dimpled tray also reduces the surface area that the bottom of each tray 60 will have with the slice of pizza that the tray rests on. This minimizes the transfer of oils and greases from the slice of pizza to the bottom face 68 of the tray 60 and also prevents the stacked pizza slices from sticking together.

Figure 13:
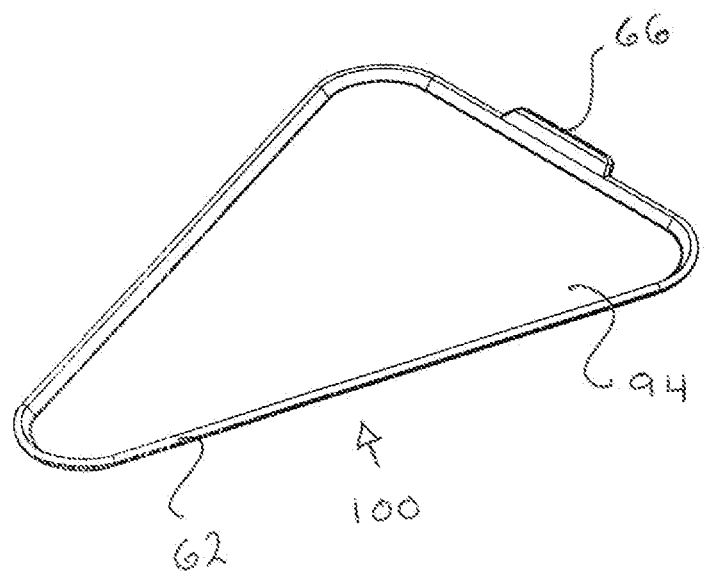
FIG. 13 is a top perspective view of an alternate embodiment smooth tray.
Figure 14:
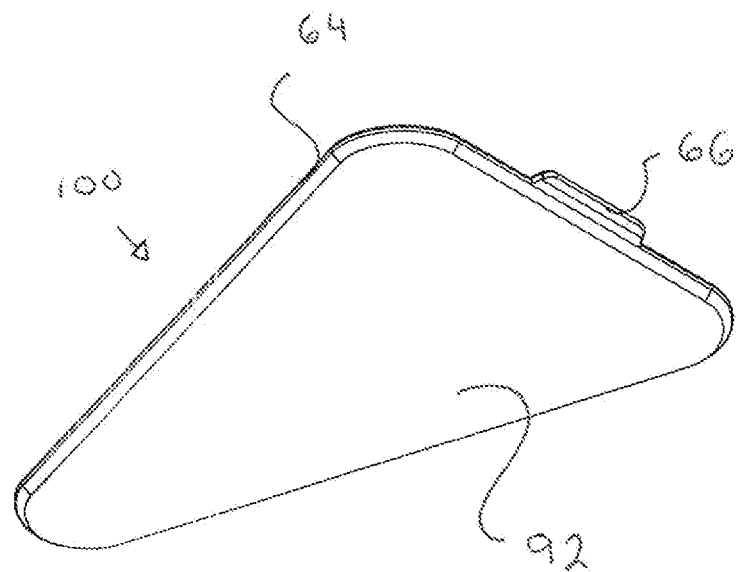
FIG. 14 is a bottom perspective view of an alternate embodiment smooth tray.

FIGS. 13 and 14 are perspective views of the top and bottom of an alternate embodiment tray 100. Here it can be seen that these are identical to the preferred embodiment dimpled tray 60 without the dimples such that the tray is trulay planar and smooth. It may or may not have a core and an outer coating or it may be made of a solid material as the dimpled tray 60.

Figure 15:
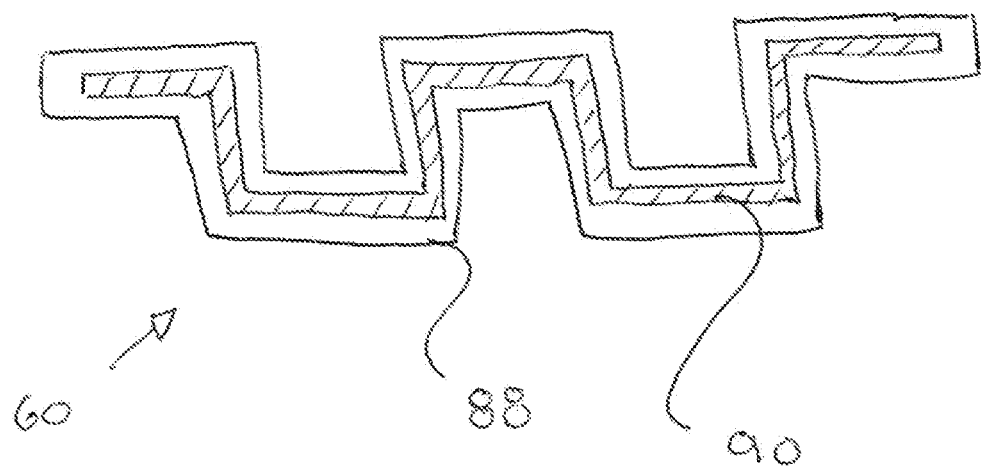
FIG. 15 is a lateral cross section taken through the dimpled tray.

Looking at FIG. 15 it can be seen in the preferred embodiment, the tray 60 is a two layer design made of a first core layer 90 coated about all surfaces with a second coating layer 88. Here, the core 90 is of a metal or alloyed steel, preferably aluminum. This core 90 has been coated with a non-stick, microwave and dishwasher safe coating 88. Because the design of the tray 60 has smooth, rounded and planar exterior surfaces (IE those without any sharp edges or pointy angles), microwaving them will not cause a build-up of electromagnetic energy, which will cause sparks and fires.

The core 90 is chosen from the set of microwave safe rigid cores such as aluminum, metal or alloyed steel, while the outer coating 88 is preferably a fluoroplastic such as per- and polyfluoroalkyl substances such as PTFE and PFA. Other acceptable coatings include but are not limited to HDPE and polypropylene. All non-metal surface coatings 88 or cores 90, must be free of both BPA and phthalates.

It is to be noted that this two layer design of a metal or alloyed steel core 90 with an outer polymer coating 88 may be reversed, wherein the core 90 can be a microwave and dishwasher safe polymer from the set of polymers as above, with an aluminum, metal or steel alloy outer coating 88. With either design, the critical feature is that the exterior of tray 60 be smooth, with rounded edges and planar surfaces.

Figure 16:
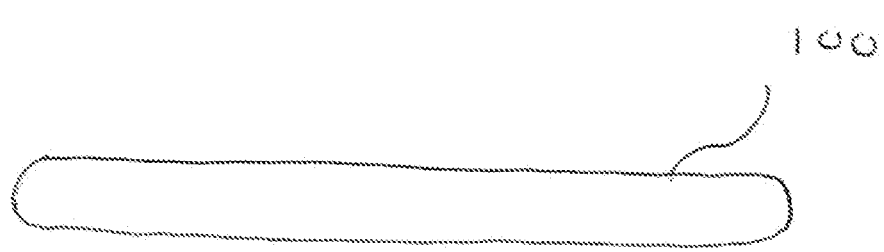
FIG. 16 is a lateral cross section taken through the smooth tray.

Still in other alternate embodiments, the trays 60 need only be solid metal, alloyed steel, or microwave and dishwasher safe polymers, as above. FIG. 16 shows a lateral cross section of the alternate embodiment tray 100 made of a solid material.

The expandable pizza container is used to store (refrigerate) multiple slices of pizza stacked atop each other and separated by triangular trays that serve to prevent the pizza slices from sticking together, to provide a drip tray to collect oils and greases when microwaved, and to act as a serving tray for single slices. The container has a vented lid with a series of locking tabs—one per container side.

In use, the lid is removed, and the bottom of the container pressed downward to expand the accordion nestled concentric triangular compartments. Slices of pizza are layered into the container from the bottom up, separated by the insertion of triangular, microwaveable trays (planar side up) between the pizza slices. When all slices are inside, the container lid is pressed into place ensuring that the lid's flexible gasket is compressed on the container's rigid top seal ring and the vent cap is free. The four side locking wings are rotated from a horizontal to a vertical position until the gasket is compressed and the lock tabs on the locking wings are frictionally captured beneath the lock tabs on the sides of the container. The bottom of the container is gently pressed upward and the nestled concentric triangular compartments are collapsed until the top slice of pizza is in close proximity to the lid. When this compartment collapse is undertaken, the vent cap will lift up slightly to allow the compressed air to escape, helping ensure freshness.

When an individual slice of pizza is desired, the lid's locking wings are rotated to an upward, horizontal position to release the lid from its frictional engagement with the container's lock tabs, and decompress the compressible gasket. The lid is removed. The tray under the top slice of pizza with the slice of pizza thereon is removed and placed in the microwave. Once heated the tray and slice of pizza are removed from the microwave and served as a unit. The above procedure is repeated to further collapse, vent and seal the container, and the container is again ready for storage.

While certain features and aspects have been described with respect to exemplary embodiments, one skilled in the art will recognize that numerous modifications are possible. Consequently, this detailed description and accompanying material is intended to be illustrative only, and should not be taken as limiting the scope of the inventive concept. What is claimed as the invention, therefore, is all such modifications as may come within the scope and spirit of the following claims and equivalents thereto.

Having thus described the invention, what is claimed as new and desired to be secured by Letters Patent is as follows:

1. An expandable pizza storage container, comprising:
   a flexible, generally triangular container body having three sides joined at rounded corners, and a planar bottom face extending perpendicularly from a bottom edge of said sides, wherein said sides are pleat folded so as to form an upper pleat and a lower pleat that are concentrically nested;
   a rigid seal ring bonded to a top edge of said sides;
   a rigid, generally triangular, planar lid with a gasket groove formed about a periphery edge of a bottom side of said lid;
   a compressible, removeable gasket frictionally retained within said gasket groove;
   a triangular tray with a top face and a bottom face;
   a peripheral lip formed there about said top face;
   a finger tab extending from said top face;
   wherein said lid resides upon said container body with said gasket in contact with said seal ring, and said tray resides within said container body.

2. The expandable pizza storage container of claim 1, further comprising:
   a vent cap operationally installed for upward and downward motion in an orifice formed in a depression formed on said lid;
   a series of four hinged locking wings extending from said periphery edge of said lid, said locking wings having T shaped lock tabs extending perpendicularly from a lower face of said locking wings;
   wherein said seal ring is a solid generally triangular ring, with a planar top face having an inner raised lip, and a planar bottom face having an outer raised lip;
   wherein said locking wings are pivotally engaged about said seal ring and said lock tabs engage around said outer raised lip so as to compress said gasket on said planar top face of said seal ring.

3. The expandable pizza storage container of claim 2, further comprising:
   an inner lid flange adjacent to said gasket groove and extending perpendicularly downward from said bottom side of said lid ((4)), said inner lid flange having a slightly smaller generally triangular configuration as said inner raised lip of said seal ring, so as to enable proper orientation of said lid onto said seal ring.

4. An expandable pizza storage container, comprising:
a flexible, generally triangular container body having three sides joined at rounded corners, and a planar bottom face extending perpendicularly from a bottom edge of said sides, wherein said sides are pleat folded so as to form an upper pleat and a lower pleat that are concentrically nested;
a rigid seal ring bonded to a top edge of said sides;
a rigid, generally triangular, planar lid with a gasket groove formed about a periphery edge of a bottom side of said lid;
a compressible, removeable gasket frictionally retained within said gasket groove;
a triangular tray with a top face and a bottom face, said top face having a series of concave dimples;
a peripheral lip formed there about said top face;
a finger tab extending from said top face;
wherein said lid resides upon said container body with said gasket in contact with said seal ring, and said tray resides within said container body.

5. An expandable pizza storage container, comprising:
a flexible, generally triangular container body having three sides joined at rounded corners, and a planar bottom face extending perpendicularly from a bottom edge of said sides, wherein said sides are pleat folded so as to form an upper pleat and a lower pleat that are concentrically nested;
a rigid seal ring bonded to a top edge of said sides;
a rigid, generally triangular, planar lid with a gasket groove formed about a periphery edge of a bottom side of said lid;
a compressible, removeable gasket frictionally retained within said gasket groove;
a triangular tray with a top face and a bottom face;
a peripheral lip formed there about said top face;
a finger tab extending from said top face;
wherein said lid resides upon said container body with said gasket in contact with said seal ring, said tray resides within said container body, and said tray has a core layer and a coating layer on said core layer.

6. The expandable pizza storage container of claim 4 wherein said tray has a core layer and a coating layer on said core layer.

7. The expandable pizza storage container of claim 4 wherein said core layer is selected from the rigid set of cores including metal or alloyed steel cores; and
wherein said coating layer is made of a BPA free and a phthalate free polymer.

8. The expandable pizza storage container of claim 7 wherein said coating layer is made from the set of BPA free and phthalate free polymer coatings selected from the group consisting PTFE, PFA, HDPE and polypropylene.

9. The expandable pizza storage container of claim 5 wherein said coating layer is made from the set of coatings consisting of a metal or alloyed steel; and
wherein said core layer is made of a BPA free and phthalate free polymer.

10. The expandable pizza storage container of claim 9 wherein said core layer is made from the set of BPA free and phthalate free polymer coatings selected from the group consisting PTFE, PFA, HDPE and polypropylene.

11. The expandable pizza storage container of claim 3 wherein said vent cap has a triangular shape, a top vent face, a bottom vent face and a flexible, compressible bulbous extension sized for frictional engagement with said orifice.

12. The expandable pizza storage container of claim 5 wherein there are five concentric vertical levels of pizza storage formed therein when said container body is expanded.

* * * * *